United States Patent
Xu et al.

(10) Patent No.: US 10,232,908 B2
(45) Date of Patent: Mar. 19, 2019

(54) BICYCLE SHAFT TRANSMISSION ASSEMBLY

(71) Applicant: NINGBO JULONG MACHINERY CO., LTD, Ningbo (CN)

(72) Inventors: Liyong Xu, Ningbo (CN); Pengxiang Xie, Ningbo (CN)

(73) Assignee: NINGBO JULONG MACHINERY CO., LTD, Ningbo (CN)

( * ) Notice: Subject to any disclaimer, the term of this patent is extended or adjusted under 35 U.S.C. 154(b) by 69 days.

(21) Appl. No.: 15/660,986

(22) Filed: Jul. 27, 2017

(65) Prior Publication Data

US 2018/0362116 A1    Dec. 20, 2018

(30) Foreign Application Priority Data

Jun. 14, 2017   (CN) .......................... 2017 1 0448295

(51) Int. Cl.
| | |
|---|---|
| *B62M 1/36* | (2013.01) |
| *B62M 11/02* | (2006.01) |
| *B62M 17/00* | (2006.01) |
| *F16H 1/20* | (2006.01) |
| *F16D 3/84* | (2006.01) |

(52) U.S. Cl.
CPC .............. *B62M 11/02* (2013.01); *B62M 1/36* (2013.01); *B62M 17/00* (2013.01); *F16D 3/843* (2013.01); *F16H 1/203* (2013.01)

(58) Field of Classification Search
CPC ......... B62M 11/02; B62M 1/36; B62M 17/00
See application file for complete search history.

(56) References Cited

U.S. PATENT DOCUMENTS

| | | | | |
|---|---|---|---|---|
| 3,861,715 A * | 1/1975 | Mendoza | ............... | B62M 17/00 280/260 |
| 4,613,010 A * | 9/1986 | Enocson | .................... | B62J 6/06 192/217.4 |
| 4,943,077 A * | 7/1990 | Lin | ......................... | B62M 17/00 280/260 |
| 5,136,892 A * | 8/1992 | Ochs | ...................... | B62M 13/02 192/46 |
| 5,482,306 A * | 1/1996 | Hsu | ......................... | B62M 17/00 280/260 |
| 5,967,537 A * | 10/1999 | Chang | .................... | B62M 17/00 280/259 |
| 6,394,477 B1 * | 5/2002 | Cellini | .................. | B62M 17/00 280/260 |

(Continued)

*Primary Examiner* — Joseph M Rocca
*Assistant Examiner* — Michael R Stabley
(74) *Attorney, Agent, or Firm* — Gokalp Bayramoglu

(57) ABSTRACT

The present invention discloses a bicycle shaft transmission assembly including a bottom bracket engaged with a crank in a front part and a wheel hub in a rear part, a front main gear mounted on the bottom bracket, a rear main gear mounted on the wheel hub, a transmission shaft eccentrically arranged between the front main gear and the rear main gear. The front main gear is matched with a front end gear, and the rear main gear is matched with a rear end gear. The front main gear is externally provided with a front housing, the transmission shaft is externally provided with a transmission shaft housing, the rear main gear is externally provided with a rear housing, a front end of the transmission shaft housing is engaged with the front housing, a rear end of the transmission shaft housing is engaged with the rear housing.

8 Claims, 5 Drawing Sheets

(56) References Cited

U.S. PATENT DOCUMENTS

| | | | | |
|---|---|---|---|---|
| 6,446,995 B1* | 9/2002 | Xu | ............................ | B62K 9/00 |
| | | | | 280/260 |
| 6,478,323 B2* | 11/2002 | Chang | ..................... | B62M 17/00 |
| | | | | 280/259 |
| 6,685,205 B1* | 2/2004 | Weaver | .................... | B62M 17/00 |
| | | | | 280/260 |
| 6,695,333 B2* | 2/2004 | Huang | ...................... | B62M 1/36 |
| | | | | 280/260 |
| 6,755,431 B2* | 6/2004 | Chang | ..................... | B62M 11/04 |
| | | | | 280/259 |
| 6,814,365 B2* | 11/2004 | Liu | .......................... | B62M 17/00 |
| | | | | 280/259 |
| 9,334,019 B2* | 5/2016 | Munkso | ..................... | B62M 6/55 |
| 2004/0119261 A1* | 6/2004 | Troutman | ............... | B62M 17/00 |
| | | | | 280/259 |
| 2010/0175947 A1* | 7/2010 | Chang | ..................... | B62M 17/00 |
| | | | | 180/385 |
| 2010/0295264 A1* | 11/2010 | Denais | ....................... | B60C 7/10 |
| | | | | 280/260 |
| 2011/0062678 A1* | 3/2011 | Chen | ........................ | B62M 17/00 |
| | | | | 280/260 |
| 2012/0086183 A1* | 4/2012 | Ken | ........................ | B60C 19/122 |
| | | | | 280/260 |
| 2015/0090071 A1* | 4/2015 | Liu | ........................... | B62M 3/00 |
| | | | | 74/594.2 |
| 2015/0192483 A1* | 7/2015 | Liu | ........................... | B62M 6/45 |
| | | | | 73/862.321 |
| 2016/0121968 A1* | 5/2016 | Lin | ........................ | B62M 11/04 |
| | | | | 74/416 |

* cited by examiner

BICYCLE SHAFT TRANSMISSION ASSEMBLY

CROSS REFERENCE TO RELATED APPLICATIONS

This application is based upon and claims priority to Chinese Patent Application No. 201710448295.2 filed on Jun. 14, 2017, the entire contents of which are incorporated herein by reference.

TECHNICAL FIELD

The present invention relates to the field of bicycle manufacturing technology, particularly relates to the bicycle transmission mechanism, and specifically relates to a bicycle shaft transmission assembly.

BACKGROUND OF THE INVENTION

Currently, concepts of green riding and low-carbon life have been increasingly accepted and implemented by society. With the development of the times and the emphasis on healthy living, the bike is no longer only a means of transportation anymore, and bicycle riding has become a new form of exercise that has entered into our lives. Existing bicycles usually use chain transmission structures, which essentially includes a crank, a wheel disk, a bicycle chain, a freewheel, etc. Namely, the wheel disk is driven to rotate by treading the pedals, and then the bicycle chain connected between the wheel disk and the freewheel is driven by the wheel disk, and the freewheel mounted on the rear wheel is driven to rotate by the bicycle chain, such that the rear wheel is driven to rotate and the bike thus moves forward. The chain transmission structure is simple with low manufacturing cost. However, a phenomenon of disengagement of the bicycle chain (namely, the disengagement of the bicycle chain from the wheel disk and the freewheel) occasionally occurs. In addition, since the bicycle chain is exposed the elements, as time goes by, the bicycle chain rusts easily such that the service life of the bicycle is reduced, thus this structure needs to be further improved.

SUMMARY OF THE INVENTION

In view of the prior art, the technical problem to be solved by the present invention is to provide a bicycle shaft transmission assembly that has a reasonable structure, a flexible and reliable transmission, a closed structure, and a long service life and can be conveniently modified.

The technical solution adopted for solving the technical problem of the present invention is as follows.

A bicycle shaft transmission assembly comprises a bottom bracket connected to and engaged with a crank in a front part and a wheel hub in a rear part, a front main gear mounted around the bottom bracket, a rear main gear mounted around the wheel hub, a transmission shaft eccentrically arranged between the front main gear and the rear main gear, wherein, the front main gear is matched with a front end gear of the transmission shaft for transmission, and the rear main gear is matched with a rear end gear of the transmission shaft for transmission.

The front main gear is externally provided with a front housing, the transmission shaft is externally provided with a transmission shaft housing, the rear main gear is externally provided with a rear housing, a front end of the transmission shaft housing is connected to and engaged with the front housing, a rear end of the transmission shaft housing is connected to and engaged with the rear housing; and the transmission mechanism is enabled to be integrally and externally mounted on the bicycle frame.

The optimized technical measures are further included as follows.

The transmission shaft further comprises a first transmission rod and a second transmission rod, and a universal joint is arranged between the first transmission rod and the second transmission rod.

The front housing is internally provided with a front gear shaft, and the front gear shaft is provided with a front pinion gear and a front bevel gear. The rear housing is internally provided with a rear gear shaft, and the rear gear shaft is provided with a rear pinion gear and a rear bevel gear.

The front main gear meshes with the front pinion gear, the front bevel gear meshes with a front end bevel gear around the transmission shaft, a rear end bevel gear around the transmission shaft meshes with a rear bevel gear, and the rear pinion gear meshes with the rear main gear.

An aligning device is provided between the rear main gear and the wheel hub.

The bottom bracket is provided with a connector, and the connector is provided with a shock absorbing pad matched therewith.

The connector is peripherally provided with a convex block, the shock absorbing pad is provided with a concave cavity which is matched with the convex block, and the convex block is embedded in the corresponding concave cavity.

The front housing is formed by correspondingly combining a first front housing body and a second front housing body.

The rear housing is formed by correspondingly combining a first rear housing body and a second rear housing body.

The transmission shaft housing is formed by correspondingly combining a first transmission shaft housing body and a second transmission shaft housing body.

Each of the two ends of the transmission shaft is provided with a joint, and the front end bevel gear and the rear end bevel gear are respectively connected and fixed to the corresponding joint.

A bicycle shaft transmission assembly is provided by the present invention. While using the assembly, the bottom bracket is driven to rotate by treading the pedals, and then the rear gear shaft is driven by the front main gear on the bottom bracket via the transmission shaft, such that the wheel hub is driven to rotate accordingly and thus make the bike move forward. The gear transmission structure makes the transmission flexible and reliable. Moreover, the entire transmission structure is arranged inside the housing to form a closed structure, which prevents the internal parts from the sun and rain, and avoids getting rusted, such that the service life of the transmission structure may be effectively improved.

The transmission mechanism is modularized, and the transmission shaft is arranged eccentrically. The transmission mechanism may integrally replace the existing bicycle transmission structure without changing the other existing structures of the bicycle, and thus has a strong adaptability. Moreover, it is convenient to install the power generation system, power system, brake system, gearshift system, and bicycle-locking system together with the present transmission mechanism, and thus the present transmission mechanism is universal and functionally expandable.

DETAILED DESCRIPTION OF THE INVENTION

Figure 1:
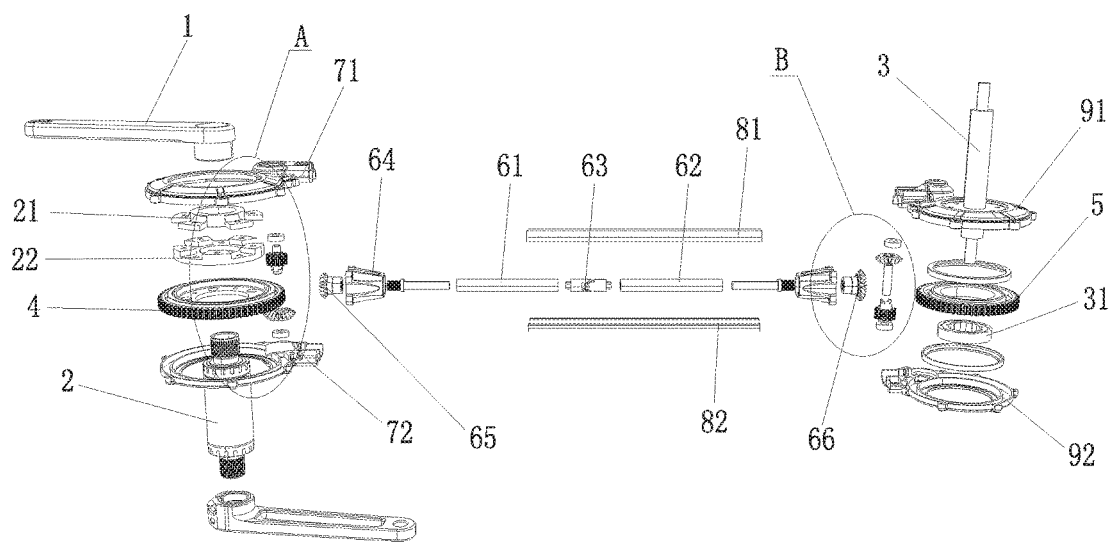
FIG. 1 is an explosive schematic view of the present invention.

The invention will now be described in further detail with reference to the drawings. FIG. 1 to FIG. 5 are the structural schematic diagrams of the present invention. Wherein the reference designators of FIG. 1 to FIG. 5 are as follows: bicycle frame J, crank 1, bottom bracket 2, connector 21, convex block 21a, shock absorbing pad 22, concave cavity 22a, wheel hub 3, aligning device 31, front main gear 4, front pinion gear 41, front bevel gear 42, rear main gear 5, rear pinion 51, the rear bevel gear 52, transmission shaft 6, first transmission rod 61, second transmission rod 62, universal joint 63, joint 64, front end bevel gear 65, rear end bevel gear 66, front housing 7, first front housing body 71, second front housing body 72, transmission shaft housing 8, first transmission shaft housing body 81, second transmission shaft housing body 82, rear housing 9, first rear housing body 91, second rear housing body 92.

Figure 2:
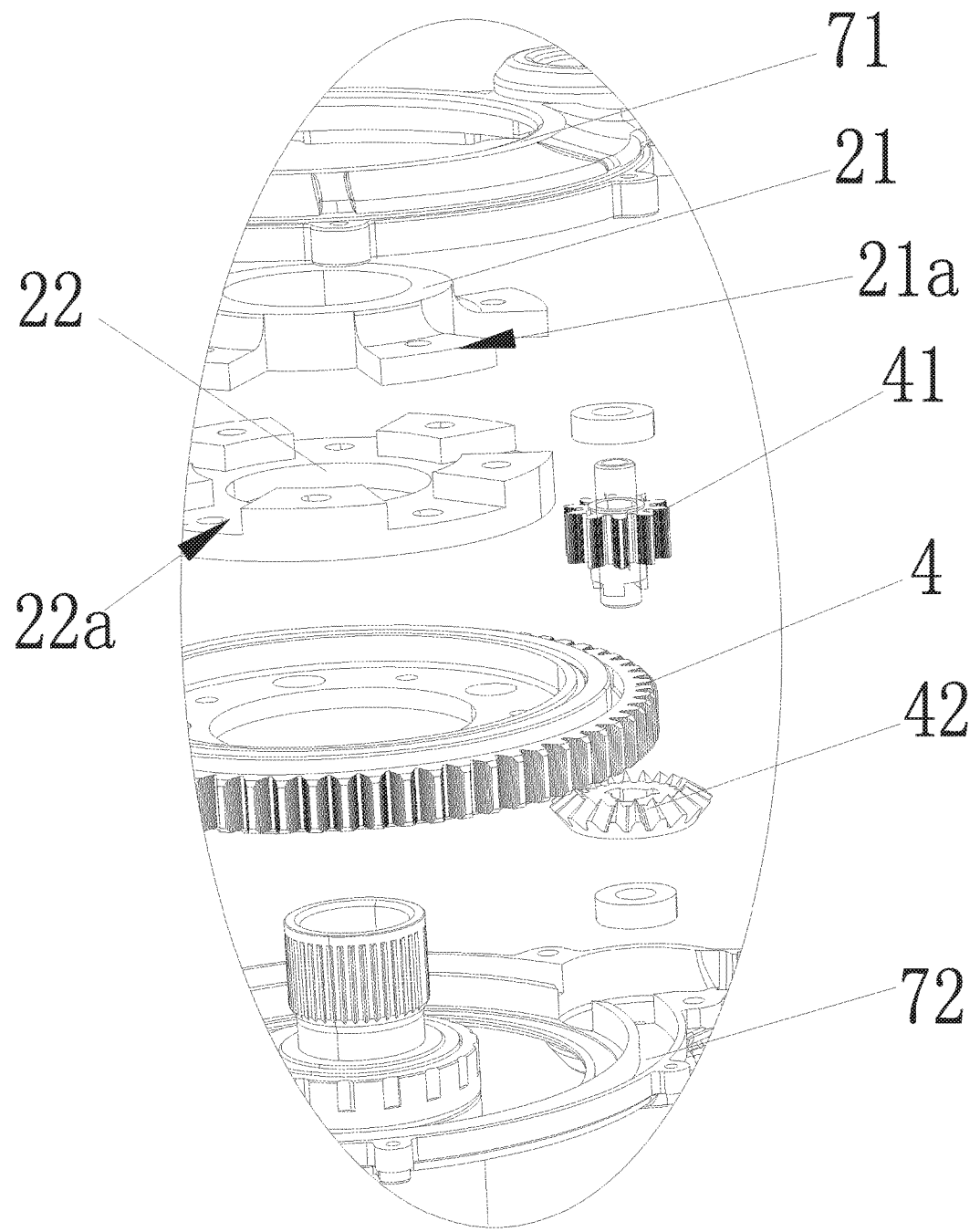
FIG. 2 is an enlarged view of part A of FIG. 1.
Figure 3:
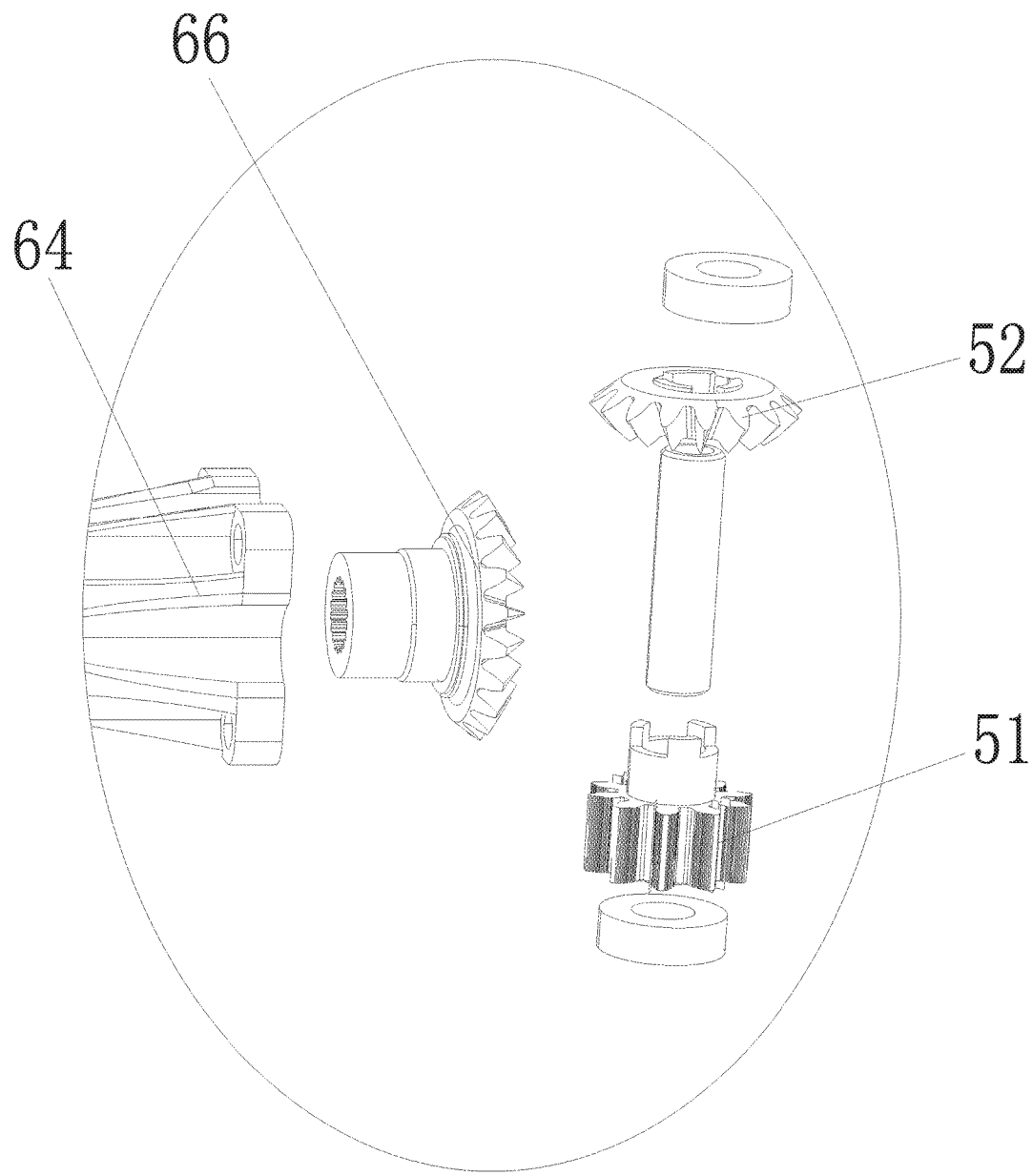
FIG. 3 is an enlarged view of part B of FIG. 1.
Figure 4:
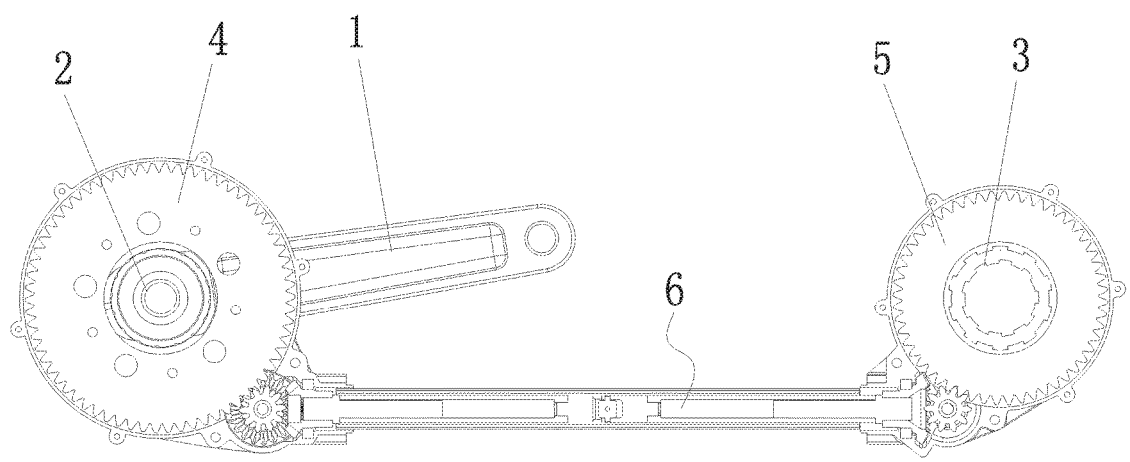
FIG. 4 is a schematic view showing a transmission relationship of the present invention.

As shown in FIG. 2, front main gear 4 is matched with front pinion gear 41, and both front main gear 4 and front pinion gear 41 could be the gear with straight tooth; rear main gear 5 is matched with rear pinion 51, and both rear main gear 5 and rear pinion 51 could be the gear with straight tooth.

As shown in FIGS. 1 and 2, front bevel gear 42 is matched with front end bevel gear 65, and both front bevel gear 42 and front end bevel gear 6 could be the bevel gear with straight tooth; rear bevel gear 52 is matched with rear end bevel gear 66, and both rear bevel gear 52 and rear end bevel gear 66 could be the bevel gear with straight tooth.

As shown in FIG. 1-FIG. 5, a bicycle shaft transmission assembly comprises bottom bracket 2 connected to and engaged with crank 1 in a front part and wheel hub 3 in a rear part. Front main gear 4 is mounted on bottom bracket 2, rear main gear 5 is mounted on wheel hub 3, and transmission shaft 6 is eccentrically arranged between front main gear 4 and rear main gear 5. Front main gear 4 is matched with a front end gear of the transmission shaft 6 for transmission, and rear main gear 5 is matched with a rear end gear of the transmission shaft 6 for transmission.

Front main gear 4 is externally provided with front housing 7, transmission shaft 6 is externally provided with transmission shaft housing 8, rear main gear 5 is externally provided with rear housing 9, a front end of transmission shaft housing 8 is connected to and engaged with front housing 7, a rear end of transmission shaft housing 8 is connected to and engaged with rear housing 9; and the transmission mechanism is enabled to be integrally and externally mounted on bicycle frame J.

In the embodiment, transmission shaft 6 further comprises first transmission rod 61 and second transmission rod 62, and universal joint 63 is arranged between first transmission rod 61 and second transmission rod 62.

The normal operation of the transmission can be ensured by providing the universal joint 63 when the front main gear 4 and the rear main gear 5 are not located on the same plane, such that the transmission mechanism can be adapted to various mounting states, and thus is more adaptable.

In the embodiment, front housing 7 is internally provided with front gear shaft, additionally front pinion gear 41 and front bevel gear 42 are provided around the front gear shaft.

Rear housing 9 is internally provided with a rear gear shaft, and rear pinion gear 51 and rear bevel gear 52 are provided around the rear gear shaft.

Front main gear 4 meshes with front pinion gear 41, front bevel gear 42 meshes with front end bevel gear 65 around transmission shaft 6, rear end bevel gear 66 around transmission shaft 6 meshes with rear bevel gear 52, and rear pinion gear 51 meshes with rear main gear 5.

In the present embodiment, a two-stage gear transmission is adopted between front main gear 4 and transmission shaft 6, and the two-stage gear transmission is also adopted between rear main gear 5 and transmission shaft 6. The use of two-stage gear transmission makes the transmission more stable. It is apparent that the use of one-stage gear transmission or multi-stage gear transmission also can achieve the purpose of transmission.

A main bearing is provided between front main gear 4 and front housing 7, and another main bearing is also provided between rear main gear 5 and rear housing 9. A minor bearing is provided between two ends of the front gear shaft and front housing 7, and another minor bearing is also provided between the two ends of the rear gear shaft and rear housing 9. The configuration of the bearings improves the flexibility of the rotation of the components and makes the bicycle more labor-saving.

Aligning device 31 is provided between rear main gear 5 and wheel hub 3. In the present embodiment, an aligning bearing is adopted as aligning device 31, and the configuration of the aligning bearing makes rear main gear 5 align automatically, so as to ensure a vertical state between rear main gear 5 and wheel hub 3, such that the operation of the entire transmission mechanism is smoother.

In the embodiment, bottom bracket 2 is provided with connector 21, connector 21 is provided with shock absorbing pad 22 matched therewith.

In the embodiment, connector 21 is peripherally provided with convex blocks 21a, and the shock absorbing pad 22 is provided with concave cavities 22a matched with convex blocks 21a, and convex blocks 21a are embedded in the corresponding concave cavities 22a.

The configuration of shock absorbing pad 22 may partially absorb vibrations to serve the purpose of shock absorption, thereby avoiding possible assembling deviations among the components caused by the vibrations and improving the stability and service life of the transmission mechanism.

In the embodiment, front housing 7 is formed by correspondingly combining first front housing body 71 and second front housing body 72.

In the embodiment, rear housing 9 is formed by correspondingly combining first rear housing body 91 and second rear housing body 92.

In the embodiment, transmission shaft housing 8 is formed by correspondingly combining first transmission shaft housing body 81 and second transmission shaft housing body 82.

Front housing 7, transmission shaft housing 8 and rear housing 9 successively abut against each other to ensure the closeness of the space inside the housings and prevent the internal parts from rusting due to sun, rain, and other elements. The gear transmission is adopted in the transmission mechanism, and the closed structure prevents the entry of the outside impurities which may cause the gears to get stuck with each other, such that the stable operation of transmission can be ensured. Moreover, the housings are correspondingly combined, such that the processing and assembly are both convenient.

In the embodiment, two ends of transmission shaft 6 are both provided with joints 64, as well as front end bevel gear 65 and rear end bevel gear 66 which are respectively connected and fixed to the corresponding joints 64 64.

The working principle of the present invention is as follows.

Figure 5:
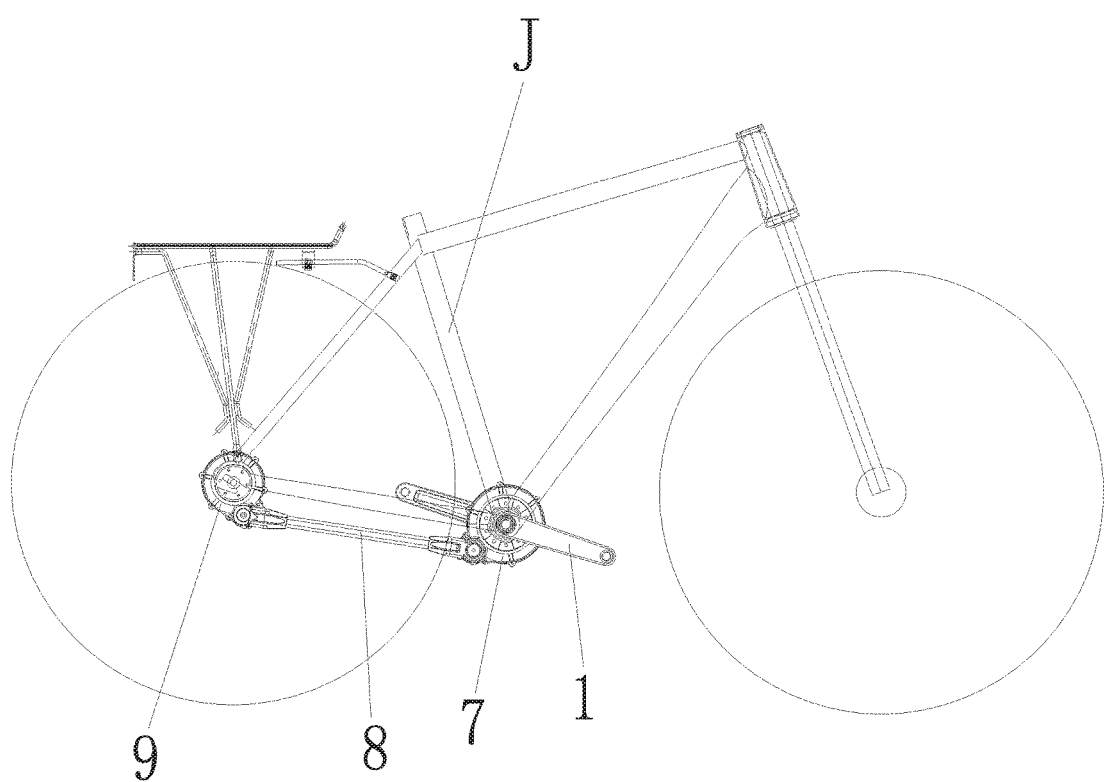
FIG. 5 is a state diagram of the present invention in use.

The transmission mechanism is modularized and can be integrally and externally mounted on the bicycle frame J. Since the transmission shaft 6 is eccentrically arranged, transmission shaft 6 is away from the connecting rod located on the lower portion of bicycle frame J (as shown in FIG. 5). Therefore, the existing chain transmission structure of the bicycle can be integrally replaced by the present transmission mechanism without changing the bicycle frame and other structures of the existing bicycle, thus the modification is very convenient.

The gear transmission structure is used in the transmission mechanism in the present invention, the ends of bottom bracket are used as an input end of power, and the ends of wheel hub are used as an output end of power. While using the present invention, front main gear 4 mounted around bottom bracket 2 will rotate when the user treads the bicycle pedals at the ends of cranks 1 to make bottom bracket 2 rotate. Since front main gear 4 meshes with front pinion gear 41 around the front gear shaft, the rotation of front main gear 4 will drive the front gear shaft to rotate. Subsequently, transmission shaft 6 is driven to rotate because front bevel gear 42 around the front gear shaft meshes with front end bevel gear 65 around transmission shaft 6. After that, the rear end gear shaft is driven to rotate because rear end bevel gear 66 around transmission shaft 6 meshes with rear bevel gear 52 around the rear end gear shaft. Subsequently, rear main gear 5 is driven to rotate because rear pinion gear 51 around the rear end gear shaft meshes with rear main gear 5 around wheel hub 3, and finally wheel hub 3 will rotate to make the bicycle move forward.

The above-mentioned gear parts are all installed inside the housing body, which not only avoids the sun and rain, but also can effectively prevent the impacts of external substances, such that the service life of the present transmission mechanism can be greatly improved and a failure rate thereof is reduced. The transmission mechanism is modularized, and can integrally replace the transmission structure of existing bicycle, and thus can be applied to any conventional bicycle frame and has a strong adaptability. In addition, the power generation system, power system, brake system, gearshift system, and bicycle locking system can be easily added to the bicycle using the transmission structure of the present invention, such that the present invention has the advantages of being versatile, easy assembly, good functional expandability, and the like.

The preferred embodiments of the present invention have been illustrated, and various changes or modifications made by those have ordinary skills in the art will not depart from the scope of the present invention.

What is claimed is:

1. A bicycle shaft transmission assembly, comprising a bottom bracket connected to and engaged with a crank in a front part of a bicycle and a wheel hub in a rear part of the bicycle,
    wherein a front main gear is mounted around the bottom bracket, a rear main gear is mounted around the wheel hub, a transmission shaft is eccentrically arranged between the front main gear and the rear main gear, wherein, the front main gear is matched with a front end gear of the transmission shaft for a transmission, and the rear main gear is matched with a rear end gear of the transmission shaft for the transmission,
    the front main gear is externally provided with a front housing, the transmission shaft is externally provided with a transmission shaft housing, the rear main gear is externally provided with a rear housing, a front end of the transmission shaft housing is connected to and engaged with the front housing, a rear end of the transmission shaft housing is connected to and engaged with the rear housing; and the transmission assembly is enabled to be integrally and externally mounted on a bicycle frame;
    wherein the transmission shaft further comprises:
    a first transmission rod and a second transmission rod,
    wherein, a universal joint is arranged between the first transmission rod and the second transmission rod;
    wherein the front housing is internally provided with a front gear shaft, a front pinion gear and a front bevel gear are provided around the front gear shaft, the rear housing is internally provided with a rear gear shaft, and a rear pinion gear and a rear bevel gear are provided around the rear gear shaft,
    wherein, the front main gear meshes with the front pinion gear, the front bevel gear meshes with a front end bevel gear around the transmission shaft, a rear end bevel gear around the transmission shaft meshes with a rear bevel gear, and the rear pinion gear meshes with the rear main gear.

2. The bicycle shaft transmission assembly of claim 1, wherein,
    an aligning device is provided between the rear main gear and the wheel hub.

3. The bicycle shaft transmission assembly of claim 2, wherein,
    a connector is provided around the bottom bracket and the connector is provided with a shock absorbing pad, wherein the shock absorbing pad matches with the connector.

4. The bicycle shaft transmission assembly of claim 3, wherein,
    the connector is peripherally provided with a convex block, the shock absorbing pad is provided with a concave cavity, the concave cavity is matched with the convex block, and the convex block is embedded in the corresponding concave cavity.

5. The bicycle shaft transmission assembly of claim 4, wherein,
    the front housing is formed by correspondingly combining a first front housing body and a second front housing body.

6. The bicycle shaft transmission assembly of claim 5, wherein,
    the rear housing is formed by correspondingly combining a first rear housing body and a second rear housing body.

7. The bicycle shaft transmission assembly of claim 6, wherein,
    the transmission shaft housing is formed by correspondingly combining a first transmission shaft housing body and a second transmission shaft housing body.

8. The bicycle shaft transmission assembly of claim 7, wherein, each of two ends of the transmission shaft is provided with a joint, and the front end bevel gear and the rear end bevel gear are respectively connected and fixed to a corresponding joint.

* * * * *